(12) United States Patent
Ben Rhouma et al.

(10) Patent No.: US 7,367,246 B2
(45) Date of Patent: May 6, 2008

(54) ADJUSTABLE STEERING COLUMN INCLUDING ELECTRICALLY-OPERABLE LOCKING MEANS

(75) Inventors: Abdel Karim Ben Rhouma, Vendome (FR); André Laisement, La Chapelle Encherie (FR); Vincent Eymery, Vendome (FR)

(73) Assignee: Nacam France S.A.S., Vendome (FR)

( * ) Notice: Subject to any disclaimer, the term of this patent is extended or adjusted under 35 U.S.C. 154(b) by 448 days.

(21) Appl. No.: 10/981,683

(22) Filed: Nov. 5, 2004

(65) Prior Publication Data

US 2005/0097978 A1 May 12, 2005

(30) Foreign Application Priority Data

Nov. 12, 2003 (FR) .................................. 03 13243

(51) Int. Cl.
B62D 1/18 (2006.01)
B62D 1/16 (2006.01)
(52) U.S. Cl. .................... 74/493; 280/775; 280/779
(58) Field of Classification Search ............ 74/492, 74/493; 474/144, 114, 115, 116, 117, 101; 280/775
See application file for complete search history.

(56) References Cited

U.S. PATENT DOCUMENTS

| 4,561,624 | A | * | 12/1985 | Freeman | ............... 248/639 |
| 5,188,392 | A |   | 2/1993  | Sugiki |  |
| 5,687,990 | A | * | 11/1997 | Uphaus | ............... 280/775 |
| 5,927,152 | A |   | 7/1999  | Marzio et al. |  |
| 6,237,438 | B1 |  | 5/2001  | Ben Rhouma |  |
| 7,055,860 | B2 | * | 6/2006 | Armstrong et al. | ......... 280/775 |
| 2003/0172765 | A1 | * | 9/2003 | Heiml | ............... 74/493 |

FOREIGN PATENT DOCUMENTS

| EP | 0 350 759 | 1/1990 |
| EP | 1 375 296 A1 | 1/2004 |

* cited by examiner

*Primary Examiner*—Richard Ridley
*Assistant Examiner*—Terence Boes
(74) *Attorney, Agent, or Firm*—Lawrence E. Laubscher, Sr.; Lawrence E. Laubscher, Jr.

(57) ABSTRACT

An adjustable vehicle steering column is locked to a vehicle chassis by a remote-controlled electrically-operable locking arrangement that is carried by one end of a locking arm the other end of which is pivotally connected with the vehicle chassis. The locking arrangement has a locking axis that is parallel with and spaced a given distance from the pivot axis of the locking arm.

13 Claims, 5 Drawing Sheets

ADJUSTABLE STEERING COLUMN INCLUDING ELECTRICALLY-OPERABLE LOCKING MEANS

BACKGROUND OF THE INVENTION

1. Field of the Invention

An adjustable vehicle steering column is locked to the vehicle chassis by a remote-controlled electrically-operable locking arrangement that is carried solely by a locking arm that is pivotally connected between the steering column and the vehicle chassis.

2. Description of the Related Art

It is well known in the prior art to provide vehicle steering columns wherein the position of the steering wheel can be adjusted in terms of height and/or in terms of depth. The position of the steering wheel is selected by the driver and is maintained in place by a locking system whose manual control consists of an operating lever that is worked by the driver.

These different types of locking devices, operated by means of a lever, possess several inconveniences. First of all, the lever can be positioned only in the proximity of the locking axis, in other words, in an area where accessibility is reduced along with poor visibility, which creates a risk of injury as the fingers are squeezed. Moreover, the locking and unlocking operations necessitate a major effort and is interfered with by the driver's knees. Finally, the operating lever is situated in areas that must be used for other functions so as to provide a good ergonomy for the driver's position. This environment can be the area of computers when the locking axis is placed adjacent or above the column spindle. This environment can also be the area where the driver's legs are located when the locking axis is placed below the column shaft, which introduces a risk of impact against the knees in case of an accident.

The present invention was developed to provide a device for locking an adjustable automotive vehicle steering column, which will eliminate the above-described inconveniences by providing remote locking control. This remote control must employ a simple and rather small device to allow great adaptation flexibility depending on the type of steering column and the environment of the driver's position.

BRIEF SUMMARY OF THE INVENTION

Accordingly, a primary object of the present invention is to provide a remote-controlled steering column locking system which includes electrically-operable locking means that are carried by one end of a locking arm that is pivotally connected at its other end with the vehicle chassis, thereby to lock the steering column adjustment means with the vehicle chassis.

According to a more specific object of the invention, the locking device for an adjustable automotive vehicle steering column comprises a steering shaft mounted in a tubular body and capable of rotation around a steering axis. The tubular body is arranged in a support assembly attached upon the vehicle chassis and said steering column can be adjusted in terms of height and/or in terms of depth.

According to another object of the invention, the locking means include an electric actuator having a rotary output shaft, a rotary movement transmission assembly; and a locking system for said steering column. The locking device is characterized in that the electric actuator and the transmission assembly are mounted on a pivotable adjustment support, the adjustment support being connected with a locking rod which passes through said adjustment support and whose axis is collinear with the locking axis and which extends generally normal to the vertical plane passing through the steering axis. The adjustment support is attached to an intermediate element which consists of a pivot element arranged forwardly of the tubular body and is arranged to pivot about an axis mounted in the support assembly, said pivot element being capable of turning around an axis which extends essentially normal to the vertical plane that contains the steering axis.

The transmission assembly includes a rotary input element connected with said electric actuator, and a rotary output element connected with said locking system.

The pivot element is arranged and connected to the support element so as to maintain the center-to-center distance between the movement input element and the locking axis at the same value during the adjustment of the position of the steering column.

According to a first embodiment of the invention, the electric actuator is an electric motor. For the transmission assembly, the movement input element consists of comprising a control pulley and the movement output element consisting of a locking pulley. An endless transmission belt is connected between the control pulley and the locking pulley.

According to a structural feature of the invention, the movement input element is a speed reducing system having a pinion and endless screw device moved by the electric motor, while the wheel moves the control pulley. The transmission belt includes a notched belt that connects the control pulley with peripheral notches to a locking pulley also having peripheral notches. The speed reducer is a casing, which receives three attachment screws mounted in three corresponding holes arranged on the adjusting support, each of these three holes being an oblong hole oriented so as to obtain adjustment of the tension of the transmission belt system.

According to a first embodiment of the invention, which is particularly important in large-scale production in the auto industry, the support assembly comprises two spaced vertical walls that are essentially parallel to the vertical plane, and the tubular body is equipped with a reinforcing block that is guided for movement between the two walls. The locking rod passes through and slides in two oblong holes for adjustment in terms of height made in the corresponding posts. The locking rod also passes through the reinforcing block and is equipped with an enlarged locking head, which is mounted in an external groove of the corresponding post so as to ensure immobilization in terms of rotation.

The adjustment support means consists of a vertical element, arranged outside the other post of the support assembly, and a connecting element, attached upon the pivot element. The locking system comprises a locking assembly, which is arranged between the corresponding post and the locking pulley and which is moved in terms of rotation by said locking pulley so as to bring about the locked position and the unlocked position.

The locking rod, which is attached in terms of translation with respect to the locking pin, passes through the locking assembly and the vertical element. Moreover, the locking rod has a threaded end that receives an axial retention screw that rests against said vertical element.

Several variants of the locking assembly are possible according to the invention. In a first version, the locking assembly consists of a threaded portion, which is made on the locking rod and which cooperates with a screw-tapped hole made in the locking pulley. A thrust bearing with needles or balls is arranged between the locking pulley and a locking brace resting against the corresponding support wall.

In a second embodiment, the locking assembly comprises a rotationally fixed cam, resting on said support wall, and a movable cam, which is rotationally moved by the locking pulley.

In a third embodiment, the locking assembly is a system with a tailpiece that comprises a rotationally fixed place resting upon said wall, a movable plate that is rotationally moved by the locking pulley, and some links that are arranged between the fixed plate and the mobile plate.

The locking device according to the present invention thus offers the advantage of easily adapting to each type of steering column and to the position of the locking rod with respect to the steering wheel. The device of the present invention, as a matter of fact, makes it possible to select the best positioning so as to comply with the ergonomy of the driver's position and the safety of the driver's knees in case of an impact. Moreover, the invention makes it possible to prevent any effort directed against the driver for locking and unlocking and any risk of injury during this operation.

BRIEF DESCRIPTION OF THE DRAWINGS

Other objects and advantages of the invention will become apparent from a study of the following specification when viewed in the light of the accompanying drawings, in which.

DETAILED DESCRIPTION OF THE INVENTION

Figure 2:
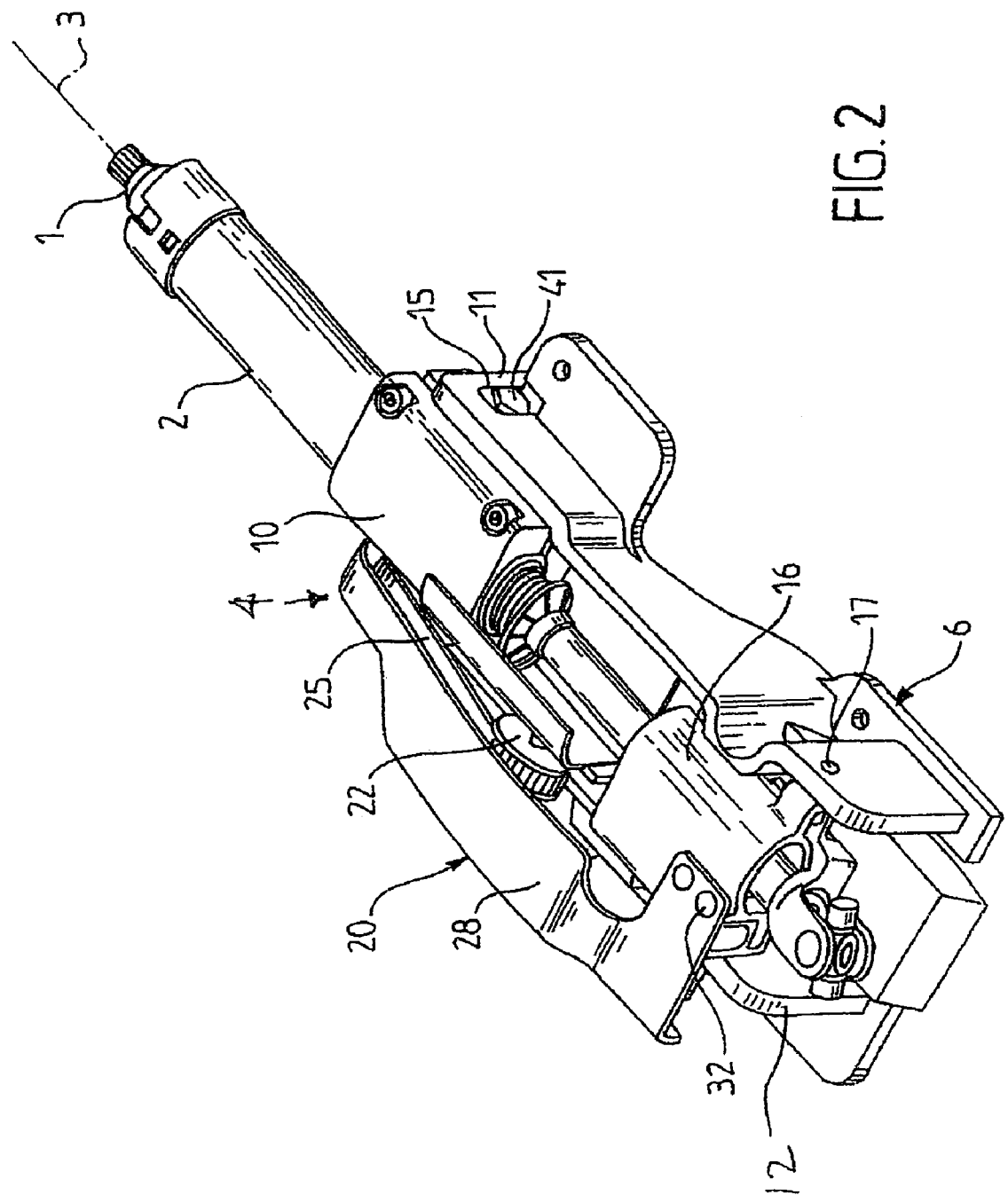
FIG. 2 is a top right side perspective view of the apparatus of FIG. 1.
Figure 3:
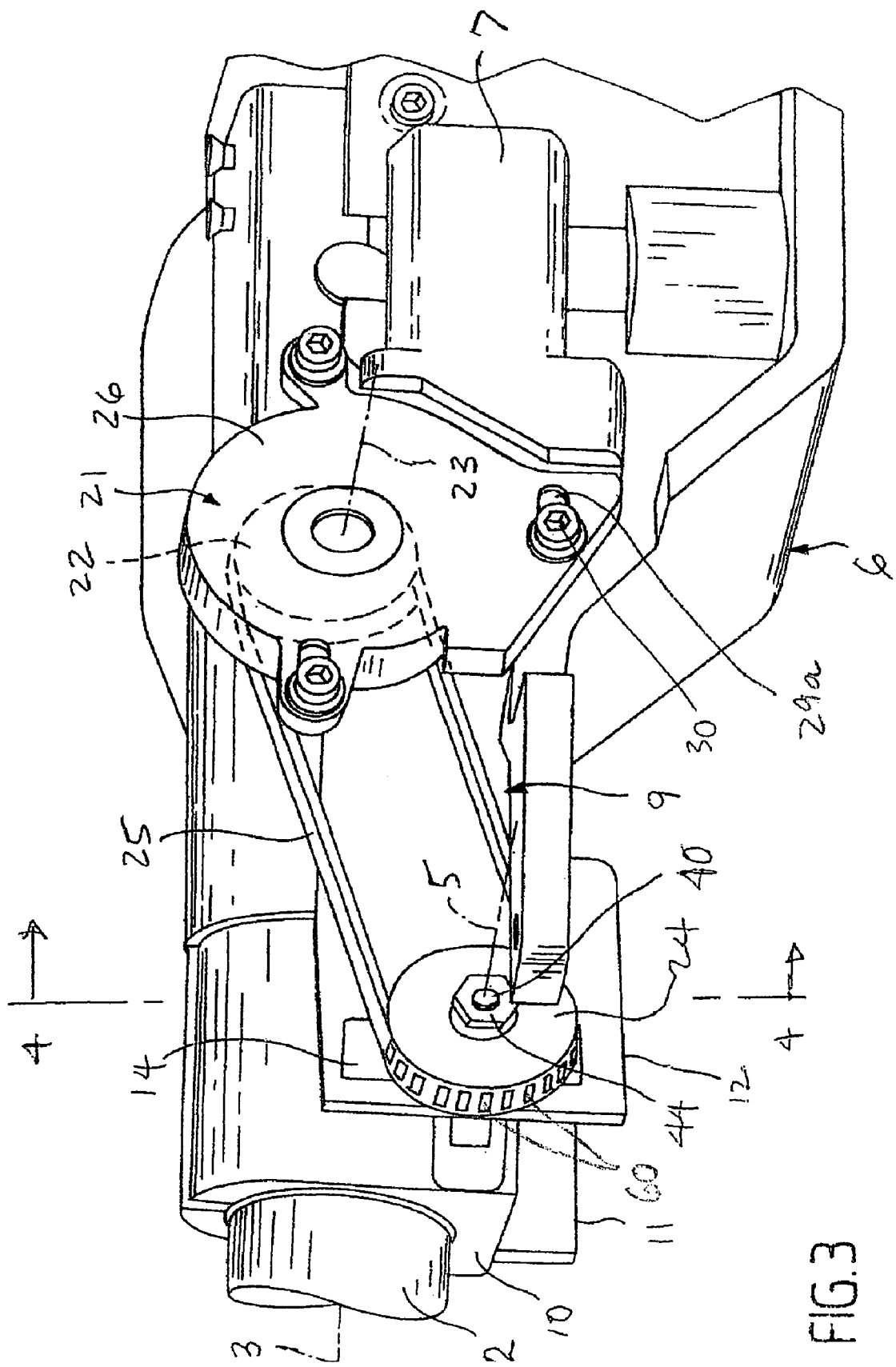
FIG. 3 is a detailed left hand perspective view of the apparatus of FIG. 1 which certain parts removed for clarity.
Figure 4:
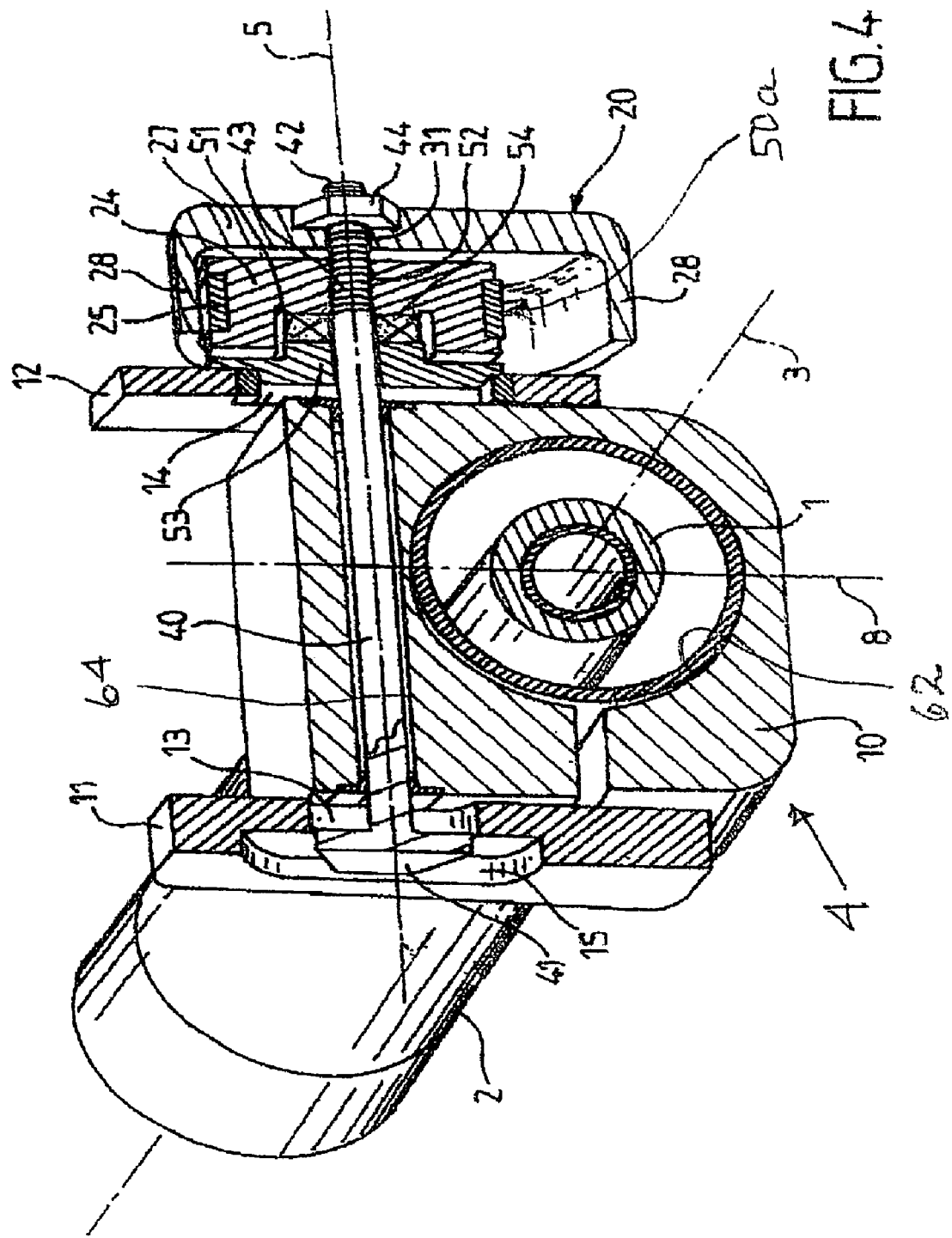
FIG. 4 is a sectional view taken along line 4-4 of FIG. 3.

Referring first more particularly to FIGS. 1-4, the vehicle steering column includes a steering shaft 1 that is mounted for rotation within a tubular body 2 and which defines a steering axis 3 contained in a vertical plane 8 (FIG. 4). The tubular body 2 is supported by and extends through a longitudinal through bore 62 contained in a reinforcing guide block 10 that is vertically displaceable between a pair of spaced vertical sidewall portions 11 and 12 of a fixed support member 6 that is secured to the vehicle chassis C.

Figure 1:
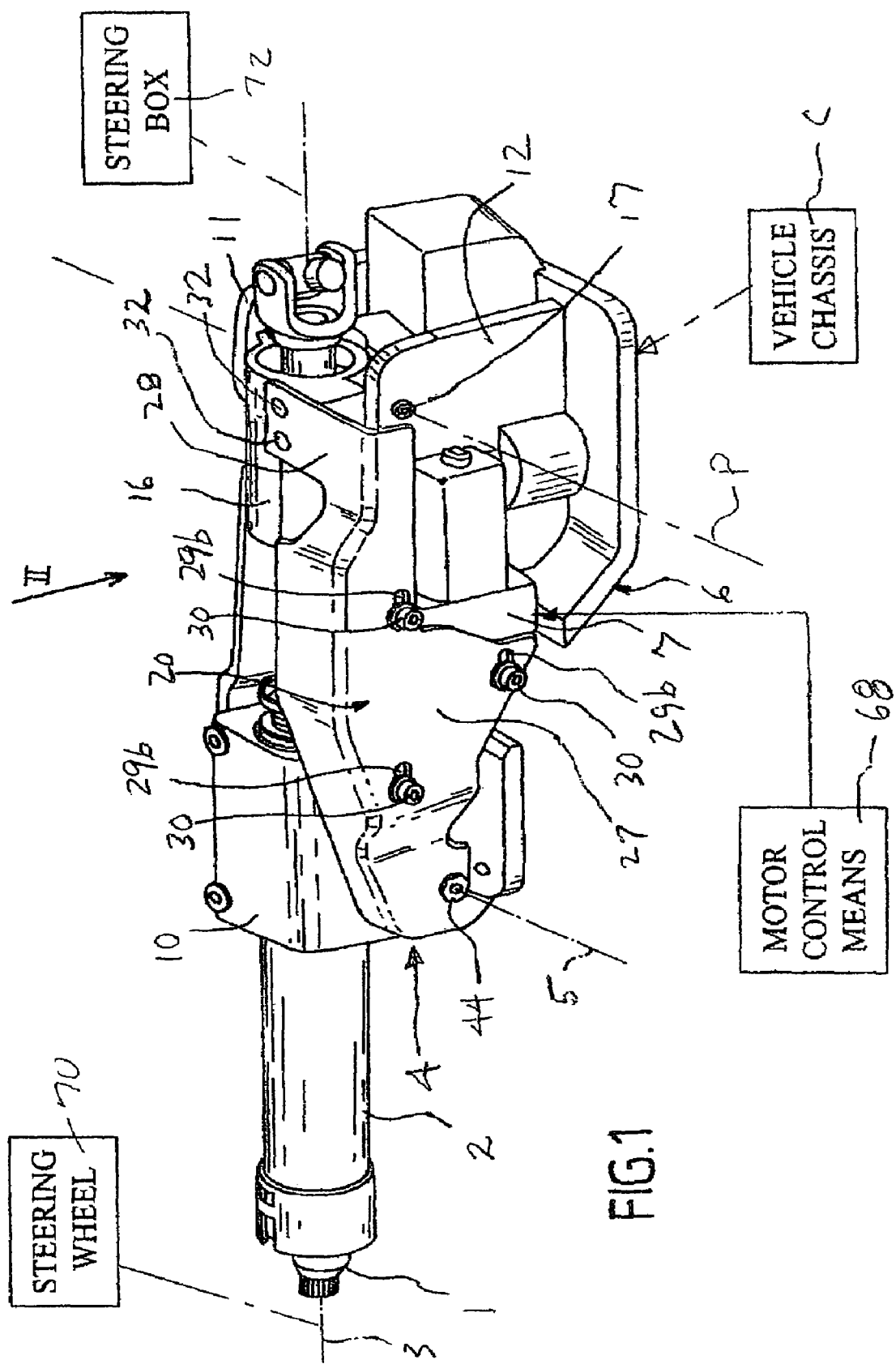
FIG. 1 is a left side perspective view of the steering column locking means of the present invention.

In accordance with the present invention, locking means 4 are provided for locking the reinforcing guide block 10 to the vehicle chassis following the adjustment of the steering column to the desired position. To this end, a locking rod 40 defining a locking axis 5 extends through transverse bore 64 contained in the reinforcing guide block 10 in a direction normal to the vertical plane 8, as best shown in FIG. 4. At one end, the locking rod 40 extends through a vertical slot 13 contained in the support sidewall 11, which end of the locking rod includes an enlarged non-circular head portion 41 that extends within a counter-bored groove 15 that communicates with the vertical slot 13. At its other end, the locking rod 40 extends through a vertical slot 14 contained in the other support sidewall 12 for connection with locking means 4 having a locking axis 5, as shown in FIGS. 1 and 4.

A locking arm 20 is provided having a vertical wall portion 27 and a horizontal wall portion 28. The locking means 4 is carried by the vertical wall portion 27 at one end of a locking arm 20, and the horizontal wall portion 28 at the other end of the locking arm is fastened by screws 32 to a tubular pivot member 16 that is pivotally connected with the support sidewalls 11 and 12 for pivotal movement about the pivot shaft 17 having a pivot axis P, as shown in FIG. 1. Thus, in accordance with a characterizing feature of the invention, the distance between the pivot axis P and the locking axis 5 defined by the locking rod 40 is constant regardless of the degree of vertical adjustment of the steering column means relative to the vehicle chassis. The tubular pivot member 16 extends concentrically about the steering shaft 1, as shown in FIGS. 1 and 2.

In accordance with another important feature of the invention, the locking means 4 of this embodiment is of the displaceable locking member type 50a operable by remote control means including a reversible electric motor 7 that is mounted on the vertical portion 27 of the locking arm 20. The electric motor 7 has an output shaft (not shown) that is connected with a drive pulley 22 (FIG. 3) via speed reduction means 21. The drive pulley 22 is connected with driven locking pulley 24 via transmission means 9 including an endless belt 25, as best shown in FIG. 3. The endless belt 25 includes a plurality of longitudinally spaced slots that are engaged by corresponding circumferentially spaced projections 60 carried by both the drive pulley 22 and the driven pulley 24.

Referring again to FIG. 4, the driven pulley 24 is threadably connected with a threaded portion 43 at the end of the locking rod 40. Lock nut 44 is non-rotatably supported by the locking arm 20 is threadably mounted on one end portion 42 of the locking rod, and at its other end, the locking rod has a non-circular enlarged head portion 41 that is non-rotatably supported in a counterbored groove 15 that communicates with the vertical slot 13 contained in support side wall portion 11. Mounted adjacent the corresponding vertical slot 14 contained in the other support side wall 12 is a fastening plate 53 that is arranged for engagement with the outer surface of support side wall 12. Ball bearing means 54 are arranged concentrically about the locking rod 40, the ball bearing means being contained in a counterbore 51 formed in the driven locking pulley 24. Thus, when the locking pulley 24 is rotatably driven in one direction by the endless belt 25, the locking pulley is displaced inwardly to cause locking plate 53 to be displaced by the ball bearing race 54 into locking engagement with the adjacent outer wall surface of the support wall 12. Guide block 10 and the vehicle steering column 1 are thus locked in the desired position relative to support member 6 and chassis C. To release the locking plate, the electric motor 7 is operated in the reversed direction by motor control means 68, whereby locking pulley 24 is driven in the opposite direction by drive belt 25 and is displaced axially to the right, thereby to release the locking plate 53 from engagement with the support wall 12. The steering column is then free for vertical adjustment of the steering wheel 70 relative to the steering box 72.

To adjust the tension of endless belt 25, the bolts 30 are unfastened thereby to permit adjustment of the speed reduction gearing casing 26 (FIG. 3) relative to the locking arm 20, as permitted by the tension adjusting slots 29a contained in casing 26, and slots 29b contained in locking arm 20.

Figure 5:
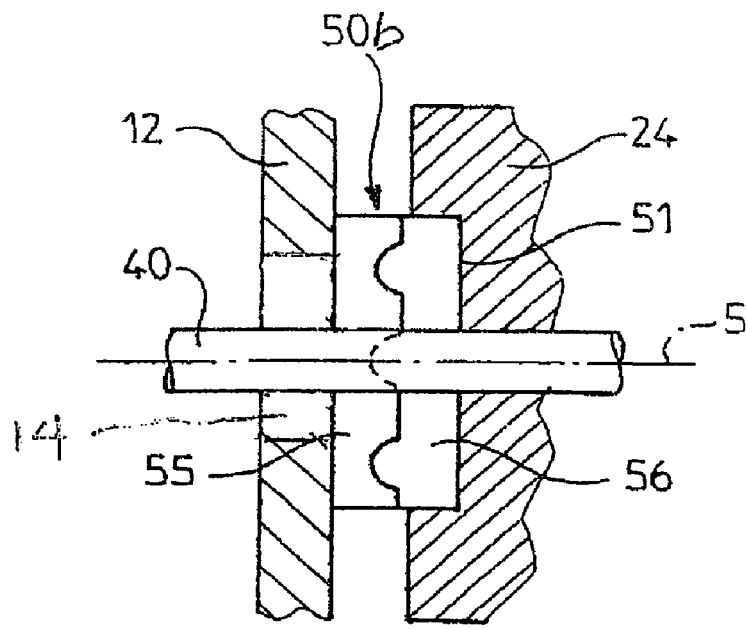
FIGS. 5 and 6 are detailed views of second and third embodiments of the locking means, respectively.

Referring now to the modification illustrated in FIG. 5, the locking means 50b includes a locking cam member 56 that is connected with locking pulley 24 for rotation relative to stationary cam 55 adjacent support wall 12. Thus, when pulley 24 is driven in one direction by drive belt 25, the stationary cam 55 is axially displaced into locked engagement with support wall 12. Operation of the pulley 24 in the opposite direction by reversible motor 7 causes cam 55 to be released from support wall 12.

Figure 6:
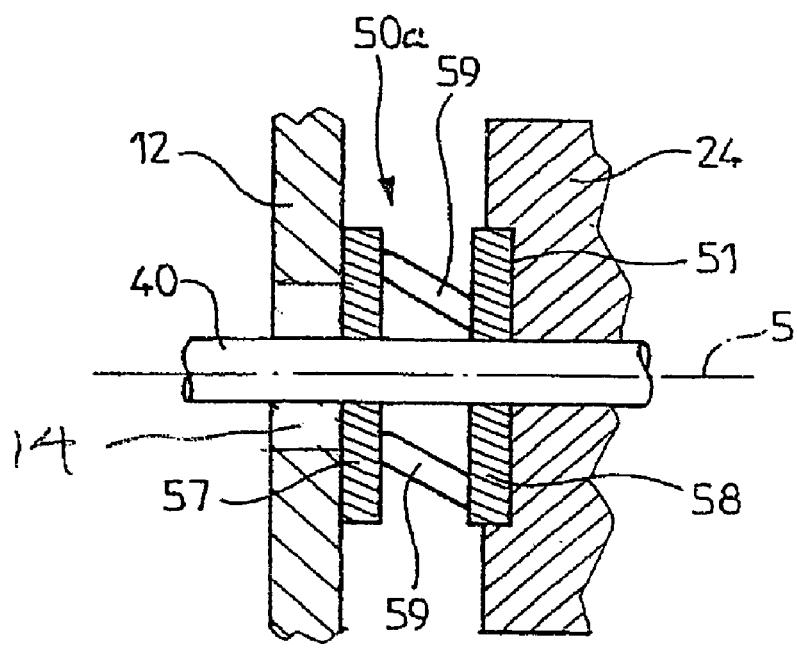

In the embodiment of FIG. 6, the locking means 50c includes a movable locking member 58 fastened to the driven locking pulley 24 for rotational displacement relative to locking member 57, the locking members being connected by a plurality of connecting links 59. Thus, when pulley 24 is driven in one direction by drive belt 25, the links 59 are pivoted to displace locking plate 57 into engagement with support wall 12. Rotation of pulley 24 in the opposite direction by the reversible motor 7 effects release of the locking plate 57 from the support wall 12.

Although the electric motor 7 has been illustrated as being connected with the driven pulley 24 via endless belt motion transmitting means, it is apparent that other types of transmission means, such as a gear train arrangement, could be used equally as well.

While in accordance with the provisions of the Patent Statutes the preferred forms and embodiments of the invention have been illustrated and described, it will be apparent to those skilled in the art that various changes may be made without deviating from the inventive concepts set forth above.

What is claimed is:

1. Locking means for locking an adjustable steering column of a vehicle to the vehicle chassis, comprising:
   (a) a fixed support member (6) adapted for connection with the vehicle chassis, said fixed support member including a pair of parallel spaced vertical side walls (11, 12);
   (b) steering column means including:
      (1) a steering shaft (1) having a longitudinal steering axis (3); and
      (2) a tubular body (2) arranged concentrically about said steering shaft, said tubular body supporting said steering shaft for rotation about said steering axis;
   (c) adjustment means connecting said steering column means for vertical adjustment relative to said fixed support member in a vertical plane (8) containing said steering axis, said adjustment means including an adjustment guide block (10) arranged for vertical displacement between said support member vertical side walls, said steering column tubular body being mounted in a longitudinal first bore (62) contained in said adjustment guide block and extending in said vertical plane; and
   (d) remote-controlled electrically-operable locking means (4) for locking said adjustment means to said fixed support member, said locking means including:
      (1) a locking arm (20) extending parallel with said vertical plane adjacent said steering column means;
      (2) pivot means (16) connecting one end of said locking arm with said fixed support member for pivotal movement about a fixed pivot axis (P) extending normal to said vertical plane;
      (3) connecting means including a locking rod (40) connecting the other end of said locking arm with said adjustment means, said locking rod being non-rotatably connected with said locking arm and extending normal to said vertical plane through a transverse second bore (64) contained in said adjustment guide block and through opposed vertical slots (13, 14) contained in said mounting member vertical side walls, respectively, said locking rod having a longitudinal locking axis (5) parallel with and spaced a given distance from said pivot axis;
      (4) a locking member (53; 55; 57) arranged for displacement along said locking axis (5) between locked and released positions relative to said fixed support member; and
      (5) operating means for operating said locking member between said locked and released positions, respectively, said operating means including:
         (a) a reversible electric motor (7) mounted on said locking arm;
         (b) rotary input means (22) mounted on said locking arm for rotation by said electric motor about a drive axis (23) normal to said vertical plane,
         (c) rotary output means (24) mounted on said locking arm for rotation about said locking axis, said rotary output means being threadably connected with said locking rod; and
         (d) rotary motion transmitting means (25) connecting said rotary input means with said rotary output means, whereby upon rotation of said electric motor, said rotary output means is axially displaced on said locking rod wherein said pivot means comprises a tubular pivot member (16) concentrically arranged in spaced relation about said steering shaft, and means (17) connecting said pivot member for pivotal movement about said pivot axis; and further wherein said locking arm includes a vertical portion (27) connected with said locking means, and a horizontal portion (28) connected with said pivot member.

2. Locking means as defined in claim 1, wherein said rotary input means comprises a drive pulley (22) mounted on said locking arm for rotation about said drive axis, said operating means further including:
   (e) speed reduction means (21) connecting said electric motor with said drive pulley.

3. Locking means as defined in claim 2, wherein said rotary output means comprises a driven locking pulley (24) connected with said locking arm for rotation about said locking axis.

4. Locking means as defined in claim 3, wherein said rotary motion transmitting means includes an endless drive belt (25) connecting said drive pulley with said driven locking pulley.

5. Locking means as defined in claim 4, wherein said endless drive belt contains a plurality of longitudinally spaced slots for receiving corresponding projections (60) arranged on the outer circumferential surfaces of said drive pulley and said driven locking pulley, respectively.

6. Locking means as defined in claim 4, and further including means for adjusting the tension of said endless drive belt.

7. Locking means as defined in claim 6, wherein said operating means includes a casing (26) rotatably supporting said drive pulley; and further wherein said tension adjusting means includes a plurality of adjustment bolts (30) extending through corresponding elongated slots (29a) contained in said casing for adjustably connecting said casing with said fixed support member.

8. Locking means as defined in claim 7, wherein said adjustment bolts extend through corresponding adjustment slots (29b) contained in said locking arm, respectively.

9. Locking means as defined in claim 2, wherein said locking rod includes a threaded end portion (43) that extends outwardly from one support side wall (12) on the opposite side thereof from said adjustment guide block, and means (41) preventing rotation of said locking rod relative to said support member; wherein said locking pulley is threadably connected with said locking rod threaded portion for axial displacement between locked and released positions relative to said one support side wall portion (12); and further wherein said locking member is arranged between said one side wall portion and said locking pulley.

10. Locking means as defined in claim 9, wherein said locking member comprises a locking plate (53), and further including ball bearing means (54) arranged between said locking plate and said driven locking pulley.

11. Locking means as defined in claim 9, wherein said locking means includes a pair of rotationally operable cams (55, 56), one of said cams being arranged adjacent said one support wall and comprising said locking member, and the other of said cams being connected with said driven locking pulley.

12. Locking means as defined in claim 9, wherein said locking means includes a first plate (57) adjacent said one support wall, a movable second plate (58) connected with said driven locking pulley, and a plurality of pivotal links (59) connected between said first and second plates for biasing said first plate into locking engagement with said one support wall.

13. Locking means as defined in claim 9, wherein said means preventing rotation of said locking rod comprises an enlarged noncircular head portion (41) at the other end of said rod that is supported against rotation in a vertical non-circular counterbored groove (15) that communicates with the vertical slot (13) contained in the associated other one of said pair of vertical support walls (11), and further including a retaining nut (44) fastened to the free end of said locking rod.

* * * * *